(12) United States Patent
Thumfart et al.

(10) Patent No.: US 12,062,763 B2
(45) Date of Patent: Aug. 13, 2024

(54) ACCUMULATOR SYSTEM HAVING A HIGH-VOLTAGE ACCUMULATOR FOR MOBILE WORK MACHINES

(71) Applicant: Wacker Neuson Linz GmbH, Hörsching (AT)

(72) Inventors: Harald Thumfart, Herzogsdorf (AT); Manes Recheis, Hörsching (AT); Robert Finzel, Leonding (AT); Thomas Erlinger, Herzogsdorf (AT); Christian Kröpl, Enns (AT); Oliver Leibetseder, Linz (AT)

(73) Assignee: Wacker Neuson Linz GmbH, Hörsching (AT)

( * ) Notice: Subject to any disclaimer, the term of this patent is extended or adjusted under 35 U.S.C. 154(b) by 162 days.

(21) Appl. No.: 17/435,263

(22) PCT Filed: Feb. 28, 2020

(86) PCT No.: PCT/AT2020/060056
§ 371 (c)(1),
(2) Date: Aug. 31, 2021

(87) PCT Pub. No.: WO2020/176915
PCT Pub. Date: Sep. 10, 2020

(65) Prior Publication Data
US 2022/0131200 A1 Apr. 28, 2022

(30) Foreign Application Priority Data
Mar. 1, 2019 (AT) .............. A 50164/2019

(51) Int. Cl.
*H01M 10/42* (2006.01)
*B60L 3/00* (2019.01)
(Continued)

(52) U.S. Cl.
CPC ......... *H01M 10/425* (2013.01); *B60L 3/0046* (2013.01); *B60L 3/04* (2013.01);
(Continued)

(58) Field of Classification Search
CPC .............. H01M 10/425; H01M 10/46; H01M 2010/4271; H01M 2200/00;
(Continued)

(56) References Cited

U.S. PATENT DOCUMENTS

2019/0044376 A1* 2/2019 Senoue .................. B60L 53/00

FOREIGN PATENT DOCUMENTS

| DE | 102013114545 | 6/2015 |
|---|---|---|
| DE | 102014204473 | 9/2015 |
| EP | 3444915 | 2/2019 |

* cited by examiner

*Primary Examiner* — Rexford N Barnie
*Assistant Examiner* — Swarna N Chowdhuri
(74) *Attorney, Agent, or Firm* — Boyle Fredrickson S.C.

(57) ABSTRACT

An accumulator system has a high-voltage accumulator for mobile work machines. A battery management system, has a controller-line connections which can be switched by switches; and a data bus for connection to a work machine control unit. In order to advantageously render an electrical-system battery unnecessary, the battery management system comprises, for voltage supply, a DC-DC converter which is located upstream of the controller in terms of current flow and which is connected to the high-voltage accumulator via a standby circuit. The standby circuit can be activated by a circuit that is external to the accumulator system.

8 Claims, 3 Drawing Sheets

(51) Int. Cl.
*B60L 3/04* (2006.01)
*B60L 15/40* (2006.01)
*B60L 58/10* (2019.01)
*H01M 10/46* (2006.01)
*H02J 9/06* (2006.01)

(52) U.S. Cl.
CPC ............... *B60L 15/40* (2013.01); *B60L 58/10*
(2019.02); *H01M 10/46* (2013.01); *H02J 9/06*
(2013.01); *B60L 2210/10* (2013.01); *H01M*
*2010/4271* (2013.01); *H01M 2200/00*
(2013.01); *H01M 2220/20* (2013.01)

(58) Field of Classification Search
CPC .... H01M 2220/20; B60L 3/0046; B60L 3/04;
B60L 15/40; B60L 58/10; B60L 2210/10;
B60L 2200/40; H02J 9/06; H02J 7/0063;
H02J 2207/10; H02J 2310/48; H02J
7/0029; H02J 9/005; H02J 1/082; Y02E
60/10; Y02T 10/70; Y02T 10/72; G01R
31/382
USPC ........................................................ 307/10.1
See application file for complete search history.

ACCUMULATOR SYSTEM HAVING A HIGH-VOLTAGE ACCUMULATOR FOR MOBILE WORK MACHINES

FIELD OF THE INVENTION

The invention relates to an accumulator system having a high-voltage accumulator for mobile work machines, comprising a battery management system which has a controller, line connections which can be switched by means of switches, and a data bus for connection to a work machine control system.

BACKGROUND OF THE INVENTION

If work machines are supplied with electrical energy from a high-power (high-voltage) accumulator, it is known practice to guarantee the 12/24 V on-board power supply of the vehicle or of the work machine by means of a separate, external energy store, for example an on-board battery (EP 2 031 135 A1). The external energy store can be recharged by the battery system via a DC/DC converter or via a generator provided in the drive train of the work machine. In the present case, the term "high power" relates to a DC circuit which can be used to transmit drive powers. Said DC circuit need not necessarily carry higher voltages than the vehicle electrical system, but transmits considerably higher powers than the 12/24 V low-voltage vehicle electrical system. A connection of a vehicle control system to a data bus of a high-voltage accumulator is known, for example, from DE 10 2013 114 545 A9.

Such known accumulator systems are used for the main provision of the drive energy, that is to say the supply of a high-power network, and for the electrical charging of the on-board battery and therefore for the supply of the on-board electronics of the work machine responsible for releasing the drive power in the high-power network. The data bus is used for communication between the low-voltage vehicle electrical system and the accumulator system. In order to establish a safe deenergized state, the electrical connection between the work machine and the high-voltage accumulator can usually be disconnected using a battery disconnection switch.

Known accumulator systems comprise one or more modules which are connected to monitoring electronics, the controller, an via internal data bus. In known systems, the controller of the accumulator system is supplied with energy by the external energy store assigned to the work machine, that is to say by the on-board battery, and so the controller can be started or started up upon actuation of the ignition switch of the work machine.

In addition to the monitoring tasks and external communication, the controller controls the enabling of the switches of the line connections. The drive supply is therefore enabled via the low-voltage vehicle electrical system which is activated when a user starts and activates the work machine. The relevant signal need not necessarily come from a key switch, but is usually directly provided via a key switch.

As long as the drive power from the drive battery has not yet been released, the vehicle, the device or the machine is supplied with energy from the external energy source. After the drive power has been released, energy can be subsequently fed from the high-voltage accumulator into the low-voltage vehicle electrical system and the external low-voltage energy store can be recharged.

The external energy source is the initial energy source for starting the high-power network by virtue of it providing energy for communication, closing switches, supplying displays and the like until the high-voltage accumulator is connected and therefore undertakes the primary energy supply of the machine. The external energy source is also used to provide energy for sidelights and hazard warning lights, for displays and lights, as long as the high-voltage accumulator has not yet been enabled, for example by actuating a key switch.

The battery management system is therefore always supplied with energy from the outside by the external energy source. The high-voltage accumulator cannot be activated without an external energy source. A device, a vehicle or a machine having a functional high-voltage accumulator but an empty on-board battery is inoperative and can be started again only with outside help.

In order to shut down and safely switch off the electrics of a machine over a relatively long period of a few hours to several months, the battery disconnection switch of the machine should usually be actuated manually. This means that manual intervention is necessary in order to ensure that the battery is not unnecessarily discharged during downtimes. Automatic switch-off is not possible.

Since the on-board battery is electrically directly connected to the vehicle mass, there is always a high risk of a short circuit during electrical work and in the event of a fault owing to the low internal resistance of the on-board battery. 12 V or 24 V starter batteries, for example, are used as on-board batteries. These give rise to additional costs and, as wear parts, must be changed approximately every 4-6 years. In addition, the on-board battery continuously consumes energy, since it always has to be recharged, and takes up further installation space which is often very limited in small devices, machines and vehicles.

When the high-voltage accumulator is switched off, sidelights, headlights and hazard warning lights of the work machine can be supplied only by the on-board battery. Depending on the application, the maximum operating time may be less than 30 minutes to a few hours. These loads can cause a deep discharge of the battery very quickly to such an extent that it is no longer possible at all to activate the high-voltage accumulator without outside help or without replacing the on-board battery.

SUMMARY

The invention is therefore based on the object of specifying an accumulator system of the type described at the outset which avoids the above-mentioned disadvantages and can be activated without an on-board battery.

The object achieves the stated object by virtue of the fact that the battery management system comprises, for supplying voltage, a DC/DC converter which is connected upstream of the controller and is connected to the high-voltage accumulator via a standby circuit, wherein the standby circuit can be activated via a circuit outside the accumulator system.

Such an accumulator system can be activated without an on-board battery, wherein operation, starting and a power supply of the work machine function without change for an operator in comparison with the prior art. When the work machine is started with an ignition lock or the like and when loads are actuated, a user immediately receives optical or functional feedback with regard to whether the work machine has been activated. However, it is necessary for this purpose to wake up and activate the battery management system during activation, which is achieved with the aid of the drive battery via the standby circuit. The accumulator system according to the invention does not require an external power supply for activation. The DC/DC converter of the accumulator system is used to supply the monitoring electronics. The accumulator system is activated upon request by a user or upon request by other components, for example charging devices, remote controls or the like. So that the controller recognizes which external circuit (key, charging device etc.) was used for activation, two or more lines may be provided for this purpose in a particularly simple solution. However, a bus system would also be conceivable. If the activation is effected by a charging device, the latter can provide the necessary charging currents or charging curves requested by the controller of the battery management system via a data bus. The DC/DC converter is a component which brings the voltage of the high-voltage accumulator to a required voltage level, for example the on-board voltage. It may also be a voltage divider or a linear voltage regulator.

The accumulator system according to the invention is preferably used in mobile work machines having a work apparatus. These may be wheel loaders, diggers or telescopic loaders. In this case, at least one work function of the work apparatus, for example lifting/lowering, retracting/extending a lifting arm, is driven by means of at least one electric motor. In this case, the electric motor can act directly on an element of the work apparatus or can drive a hydraulic element, for example a hydraulic motor or a piston/cylinder unit, by means of a hydraulic pump. The work apparatus may be a lifting arm, as is known, for example, from wheel loaders, telescopic loaders or diggers from the prior art. Such work machines and their work apparatuses are usually used to move or transport material, for example bulk material (sand, soil).

The request from a user or from other components may be a continuous signal or a pulse. However, in order to protect the battery from deep discharge in the event of cable faults, for example, the corresponding line which was used to make the request is preferably given a high impedance via a skilled electronic circuit. As a result, a signal of a continuous request is converted into a pulse using this circuit.

The DC/DC converter provides the constant supply (corresponds to a switched-on ignition of a conventional vehicle) for the vehicle electrical system until the high-voltage accumulator has been enabled. The internal DC/DC converter is preferably protected from an external overload. In contrast to the prior art, the supply for the vehicle electrical system is enabled from the battery management system.

Activation of the high-voltage accumulator, for example by actuating a key switch, is carried out by the battery management system which carries out a self-test after it has been activated and activates a hold circuit. As a result, the battery management system can also switch itself off again if the external request is interrupted. The supply of the vehicle electrical system with a continuous pulse is activated by the standby circuit, but only for a few seconds for reasons of safety, until the controller has booted and subsequently assumes the hold function. This ensures that the accumulator can deactivate itself in the case of a fault-related continuous request.

So that the hazard warning lights and sidelights can also wake up the battery electronics, for example without an ignition key, there are separate input circuits, on the basis of the activation of which the battery management system can specifically enable connections. For emergency operation with hazard warning lights and with sidelights, the drive battery therefore provides a much larger energy source than is the case in the known solutions with a low-voltage battery which is usually very small, and therefore extends the maximum operating time in the event of maintenance or in the event of a breakdown. As a result of the high-voltage accumulator being automatically switched off by the battery management system when the circuit outside the accumulator system is deactivated, it is possible to dispense with manually disconnecting the high-voltage accumulator when shutting down the work machine. The machine is therefore always automatically prepared for longer downtimes. As a result of the fact that the drive battery is insulated from the low-voltage side, it is possible to dispense with a current source having high short-circuit currents and a low internal resistance on the low-voltage side in the on-board electronics. Since DC/DC converters and charging devices of the accumulator system are current-limited, there is also no need to fear any short circuits. For electrical work and in the event of a fault, the risk of injuries and the risk of fire caused by short circuits on the low-voltage side is greatly reduced.

In order to ensure safety, it is proposed that a safety circuit is integrated in a circuit which, in addition to the high-voltage accumulator, comprises at least the standby circuit, the controller and the circuit outside the accumulator, in order to protect against overvoltages, unintentional discharge or deep discharge and/or false signals. For a separate power supply, for example for hazard warning lights or for lighting systems, without enabling drive components, provision may be made of an additional high-power output which corresponds to a switched pulse (terminal 15) of a conventional vehicle and is enabled upon request by the controller. All signal lines are preferably routed through a safety circuit.

In principle, it is advantageous if at least two line connections are provided, wherein at least one forms a high-voltage connection connected directly to the high-voltage accumulator and at least one other forms a low-voltage connection connected to the DC/DC converter.

In addition, the high-voltage connection and/or the low-voltage connection may each comprise at least two line connections which can be switched via switches, at least one of which is activated by the controller in a standby position of the work machine and all of which are activated by the controller in a work position.

The invention also relates to a vehicle having an accumulator system and having a circuit which is outside the accumulator system and is a key circuit, a charging circuit, a standby circuit and/or an emergency circuit.

BRIEF DESCRIPTION OF THE DRAWINGS

The subject matter of the invention is illustrated, for example, in the drawing, in which.

DETAILED DESCRIPTION

Figure 1:
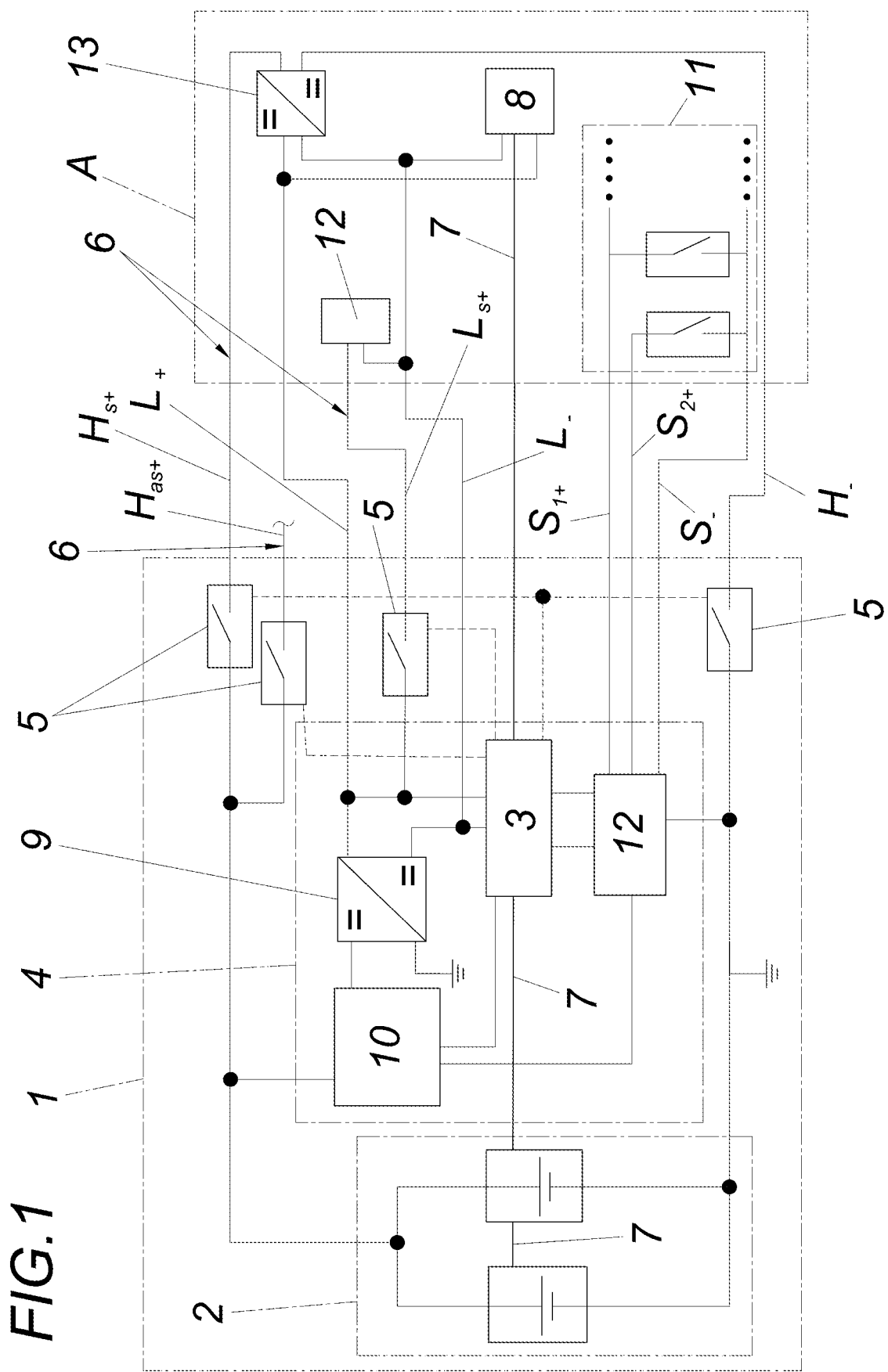
FIG. 1 shows a schematic circuit diagram of an accumulator system connected to a work machine.
Figure 2:
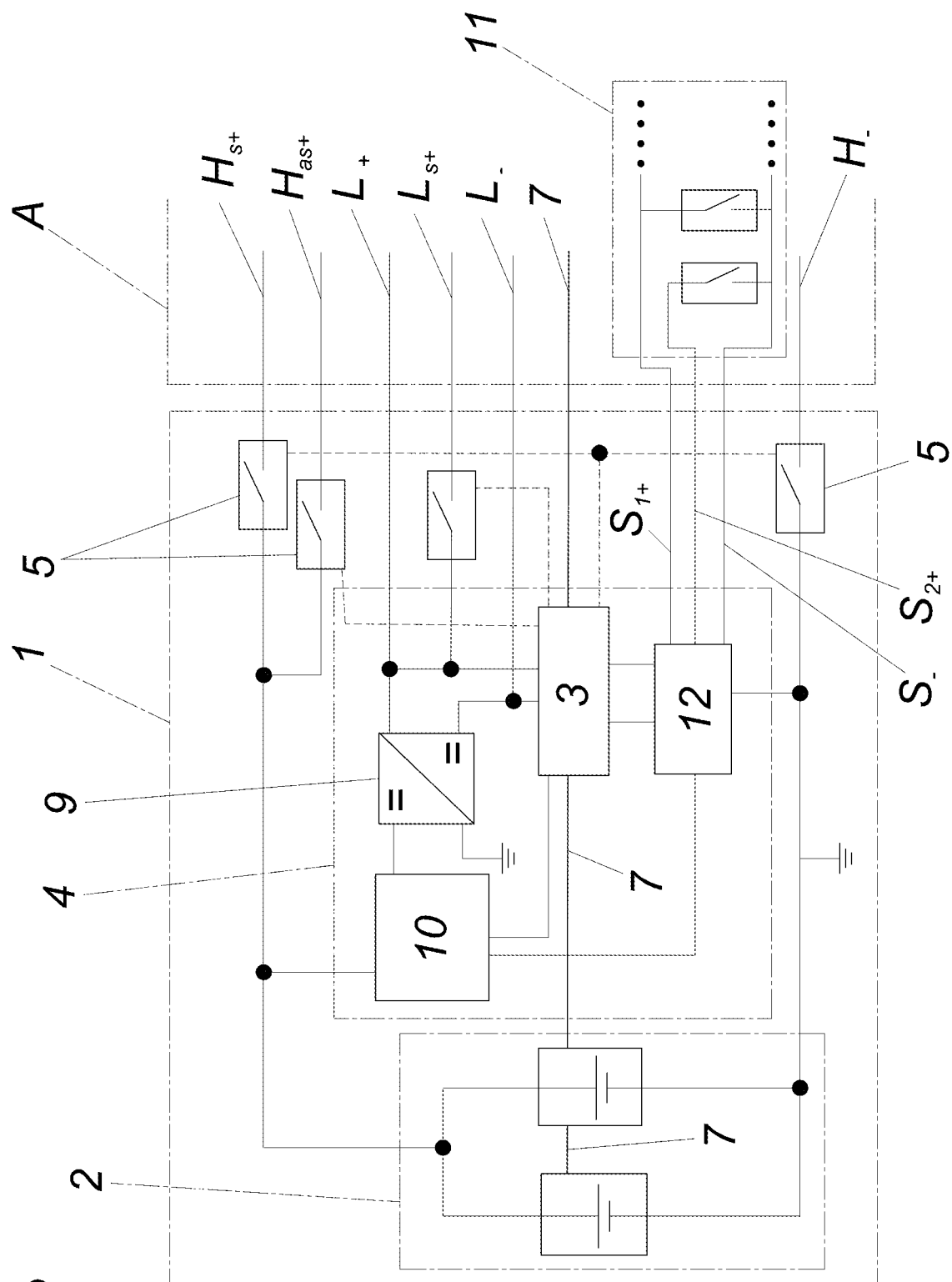
FIG. 2 shows the circuit diagram of the accumulator system from FIG. 1.
Figure 3:
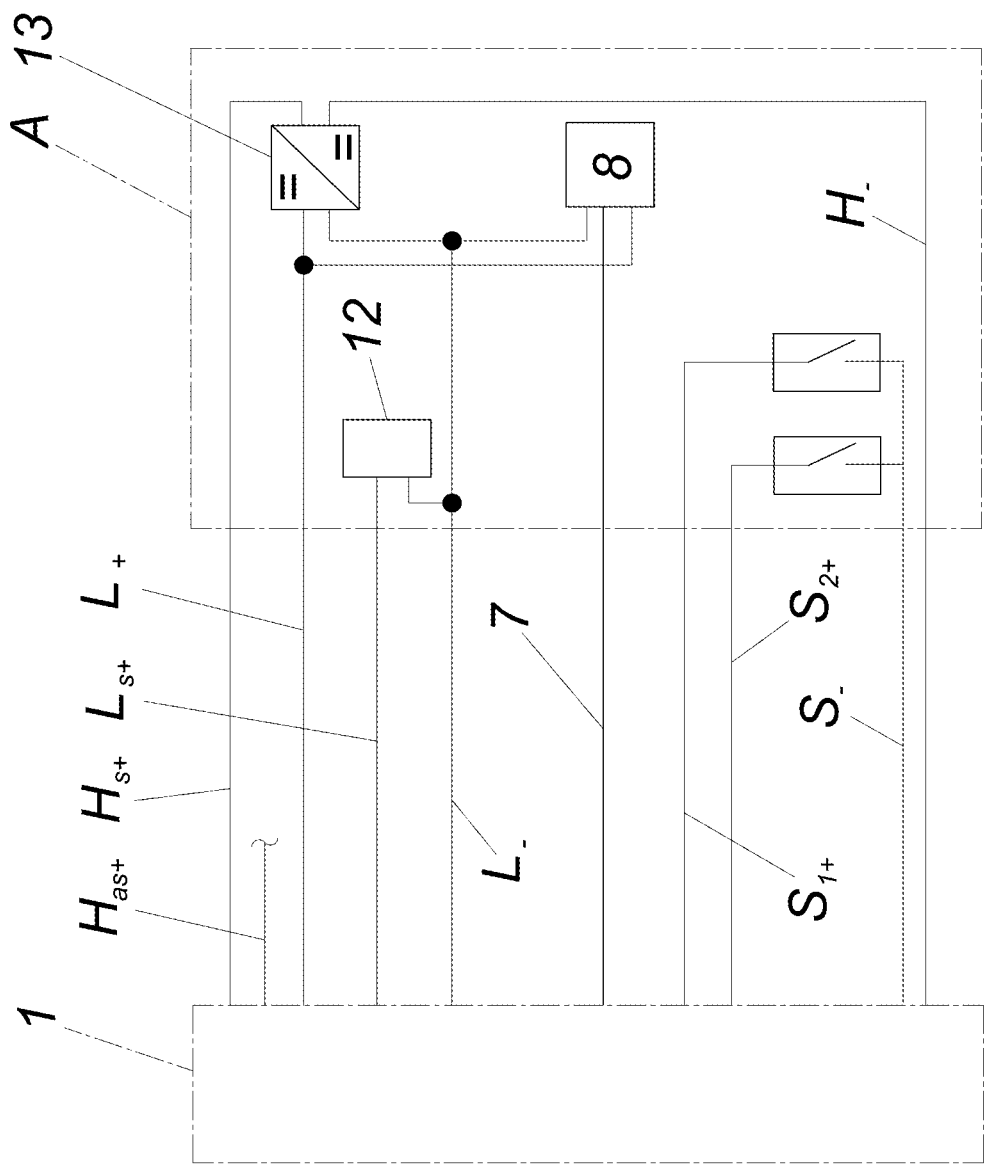
FIG. 3 shows the circuit diagram of the work machine from FIG. 1.

The accumulator system 1, which can be accommodated by a work machine A, in particular in a replaceable manner, comprises a high-voltage accumulator 2 which provides corresponding drive powers, a battery management system 4 which has a controller 3, line connections 6 which can be switched by means of switches 5, and a data bus 7 for connection to a work machine control system 8.

According to the invention, the battery management system 4 has, for supplying voltage to the controller 3, a DC/DC converter 9 which is located upstream of the controller 3 and, for the purpose of supplying voltage to the controller 3, is connected to the high-voltage accumulator 2 via a standby circuit 10. The standby circuit 10 can be activated via a circuit 11 outside the accumulator system.

A safety circuit 12 is integrated in a circuit which, in addition to the high-voltage accumulator 2, comprises at least the standby circuit 10, the controller 3 and the circuit 11 outside the accumulator, in order to protect against overvoltages, unintentional discharge or deep discharge and/or the supply of false signals.

A plurality of line connections (6) are provided in the exemplary embodiment, wherein two high-voltage connections $H_{S+}$, $H_{AS+}$ which are connected to the high-voltage voltage accumulator (2) and can be switched by means of switches 5 are provided for the purpose of supplying high power to the work machine A and two low-voltage connections $L_+$, $L_{S+}$ which are connected to a DC/DC converter 9 are provided for the purpose of supplying energy to the on-board electronics of the work machine A. The DC/DC converter 9 is also used to supply energy to the controller 3 when the standby circuit 10 is activated.

The high-voltage connection and/or the low-voltage connection each comprise(s) at least two line connections (6) which can be switched via switches 5, at least one of the line connections 6 of which is activated by the controller 3 in a standby position of the work machine in order to supply the on-board electronics of the work machine with energy and in order to make it possible to activate the work machine. All switches 5 can be activated by the controller 5 in a work position.

A vehicle, in particular a self-driving work machine A (FIG. 1), is equipped with such an accumulator system and with a circuit 11 which is outside the accumulator system and is intended to activate the accumulator system, wherein the circuit 11 outside the accumulator system is a key circuit, a charging circuit, a standby circuit and/or an emergency circuit.

In order to activate an accumulator system according to the invention using a circuit 11 outside the accumulator system, the standby circuit 10 is first of all activated by actuating the circuit 11 outside the accumulator system, after which the standby circuit 10 supplies the DC/DC converter 9 and the controller 3 with voltage and after which line connections 6 are selectively enabled via the associated switches 5 on the basis of the signal from the circuit 11 outside the accumulator system. In addition, the controller 3 can have a control connection to the work machine control system 8 and possibly to further components, for example a charging device and/or an inverter, via the data bus 7 on the basis of the signal from the circuit 11 outside the accumulator system after the battery management system 4 has been started up. The battery management system 4 therefore detects whether the work machine is intended to be activated or charged, for example, and activates the corresponding functions.

The standby circuit 11 is activated by means of a signal from the circuit 11 outside the accumulator system. The signal may be a continuous signal or a pulse.

The vehicle electrical system naturally comprises a multiplicity of loads 12, only one of which is indicated, however. The DC/DC converter 13 of the vehicle electrical system has two connections each on the primary and secondary sides in order to be able to electrically connect the reference potentials of the work machine A and the accumulator system 1.

The invention claimed is:

1. An accumulator system for a mobile work machine, comprising:
    a high-voltage accumulator; and
    a battery management system which has a controller and a DC/DC converter which is located upstream of the controller in terms of current flow and which supplies voltage to the controller,
    at least two line connections which are connected to at least one of the high-voltage accumulator and to the battery management system and which can be switched on and off via switches, and
    a data bus which connects the battery management system to a work machine control system, wherein the battery management system is connected to the high-voltage accumulator via a standby circuit, and wherein the standby circuit can be activated via a circuit that is located outside of the accumulator system,
    wherein at least one of the line connections forms a first voltage connection directly connected to the high-voltage accumulator,
    wherein at least one other line connection forms a second voltage connection between the DC/DC converter and the mobile work machine, and
    wherein at least one of the first voltage connection and the second voltage connection comprises at least two line connections which can be switched via at least one of the switches, wherein at least one of the switches can be activated by the controller in a standby position of the work machine, and wherein all of the switches that activate the line connections of the at least one of the first voltage connection and the second voltage connection are activated by the controller in a work position.

2. The accumulator system as claimed in claim 1, further comprising a safety circuit which is integrated in a circuit which, in addition to the high-voltage accumulator, comprises at least the standby circuit, the controller and the circuit that is outside the accumulator, and wherein the safety circuit is configured to protect against overvoltages, unintentional discharge or deep discharge, and/or false signals.

3. A vehicle comprising:
    a vehicle having a plurality of electrical loads;
    a work machine control system connected to the electrical loads;
    an accumulator system including
        a high-voltage accumulator,
        a battery management system which has a controller and a DC/DC converter which is located upstream of the controller in terms of current flow and which supplies voltage to the controller,
        at least two line connections which are connected to at least one of the high-voltage accumulator and to the battery management system and which can be switched on or off via switches, and
        a data bus which connects the battery management system to the work machine control system; and
        a standby circuit via which the battery management system is connected to the high-voltage accumulator, wherein the standby circuit can be activated via a circuit that is located outside of the accumulator system, wherein at least one of the line connections forms a first voltage connection directly connected to the high-voltage accumulator, wherein at least one other line connection forms a second voltage connection between the DC/DC converter and the vehicle, the first voltage being higher than the second voltage, and wherein at least one of the first voltage connection and the second voltage connection comprises at least two line connections which can be switched via at least one of the switches, wherein at least one of the switches can be activated by the controller in a standby position of the work machine, and wherein all of the switches that activate the line connections of the at least one of the first voltage connection and the second voltage connection are activated by the controller in a work position.

4. The vehicle as claimed in claim 3, wherein the circuit that is located outside of the accumulator system comprises one or more of a key circuit, a charging circuit, a standby circuit and an emergency circuit.

5. A method for operating an accumulator system of a work vehicle, the accumulator system including a high-voltage accumulator, a battery management system which has a controller and a DC/DC converter which is located upstream of the controller in terms of current flow and which supplies voltage to the controller, at least two line connections which are connected to at least one of the high voltage accumulator and the battery management system and which can be switched on or off via switches, and a data bus which connects the battery management system to a work machine control system, the method comprising:

activating a standby circuit using an actuating circuit located outside of the accumulator system; then supplying the DC/DC converter and the controller with voltage via the standby circuit; and then selectively enabling the at least two line connections via the associated switches on the basis of a signal from the circuit that is located outside the accumulator system, wherein at least one of the line connections forms a first voltage connection directly connected to the high-voltage accumulator, and wherein at least one other line connection forms a second voltage connection between the DC/DC converter and the vehicle, the second voltage being lower than the first voltage;

wherein at least one of the first voltage connection and the second voltage connection comprises at least two line connections which can be switched via at least one of the switches, wherein at least one of the switches can be activated by the controller in a standby position of the work machine, and wherein all of the switches that activate the line connections of the at least one of the first voltage connection and the second voltage connection are activated by the controller in a work position.

6. The method as claimed in claim 5, wherein the controller has a control connection to a work machine control system via the data bus on the basis of a signal received from the circuit that is located outside the accumulator system after the battery management system has been started up.

7. The method as claimed in claim 6, wherein the controller has a control connection to at least one of a charging device and an inverter via the data bus on the basis of a signal received from the circuit that is located outside the accumulator system after the battery management system has been started up.

8. The accumulator system as claimed in claim 1, wherein, the second voltage is lower voltage than the first voltage.

* * * * *